(12) United States Patent
Hsu

(10) Patent No.: US 11,015,633 B2
(45) Date of Patent: May 25, 2021

(54) SNAP FIT FASTENERS

(71) Applicant: Illinois Tool Works Inc., Glenview, IL (US)

(72) Inventor: Abel Hsu, Kaohsiung (TW)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/965,129

(22) Filed: Apr. 27, 2018

(65) Prior Publication Data

US 2019/0331149 A1  Oct. 31, 2019

(51) Int. Cl.
*F16B 21/08* (2006.01)
*F16B 21/06* (2006.01)

(52) U.S. Cl.
CPC .......... *F16B 21/086* (2013.01); *F16B 21/065* (2013.01)

(58) Field of Classification Search
CPC ...... F16B 21/086; F16B 21/065; F16B 21/08; Y10T 24/44026
USPC .................................................. 411/502–510
See application file for complete search history.

(56) References Cited

U.S. PATENT DOCUMENTS

| | | | | |
|---|---|---|---|---|
| 4,762,437 | A * | 8/1988 | Mitomi | F16B 21/02 24/297 |
| 5,706,559 | A | 1/1998 | Oliver | |
| 5,795,118 | A * | 8/1998 | Osada | B29C 65/0672 411/171 |
| 8,701,246 | B2 * | 4/2014 | Allen | A61L 2/26 16/2.1 |
| 8,753,055 | B2 * | 6/2014 | Ruckel | F16B 37/0842 411/182 |
| 9,695,850 | B2 * | 7/2017 | Hirakawa | F16B 5/0621 |
| 2008/0141501 | A1 * | 6/2008 | Kuroda | F16B 21/086 24/297 |
| 2009/0133449 | A1 | 5/2009 | Bard | |
| 2019/0032696 | A1 * | 1/2019 | Sbongk | B60R 13/0243 |

FOREIGN PATENT DOCUMENTS

JP    S60158063    8/1985

OTHER PUBLICATIONS

Int'l Search Report and Written Opinion Appln. No. PCT/US2019/018418 dated Apr. 23, 2019.

* cited by examiner

*Primary Examiner* — Robert Sandy
*Assistant Examiner* — Rowland Do
(74) *Attorney, Agent, or Firm* — McAndrews, Held & Malloy, Ltd.

(57) ABSTRACT

A snap fit fastener may include a head, a first group of wings, and a second group of wings. The first group of wings may be disposed axially around a center axis of the head, each of the first group of wings has a first length, and includes a first end connected to the head and a second end opposing the first end. The second group of wings may be disposed axially around the center axis of the head, each of the second group of wings has a second length, and includes a first end connected to the head and a second end opposing the first end. The first length may be different from the second length. A snap fit fastener with at least two groups of protrusions for fitting multiple heights is also disclosed.

10 Claims, 4 Drawing Sheets

SNAP FIT FASTENERS

FIELD

The present disclosure is generally related to fasteners, particularly related to snap fit fasteners.

BACKGROUND

A snap fit fastener provides a fast and convenient way for assembly an object onto a surface of a product by pressing the object into a hole on the panel of the product. Conventional snap fit fasteners have two legs, or so called wings, disposed around the edges of the object with a specific height dedicated to fit the particular height of the panel. By inserting a compression force onto the object, the two wings of the snap fit fastener will be deformed and squeezed into the hole, and then grab onto the inner surface of the panel.

Usually, each one of the snap fit fasteners is designed for connecting an object to one particular product at a specific location. Therefore, the wings of the snap fit fastener are molded to have identical shape and height, and can only fit within a specific hole of the product. That is, in case the configurations of the housing is changed due to the replacement or deformation by external impact, the snap fit fastener can no longer fit the shape or size changes of the hole, and thus cannot hold the object of the product in place.

Moreover, conventional snap fit fasteners only have two or a few number of wings scattered at the corners of the object. Consequently, in case one or two wings are broken or damaged, the snap fit fastener cannot function and will be easily fall off. As such, the snap fit fastener should be replaced with new ones frequently. If the snap fit fastener does not perfectly match with the hole, the object assembled on the product will be loosen, and might even rotate against or fall out from the product.

Therefore, there is a need to provide an improved snap fit fastener which can securely hold on to the product when being assembled.

SUMMARY

In view of the technical problems stated above, the present disclosure is aimed at providing solutions that are advantageous over the conventional techniques.

In one aspect, a snap fit fastener of the present disclosure may include a head, a first group of wings, and a second group of wings. The first group of wings may be disposed axially around a center axis of the head, each of the first group of wings has a first length, and includes a first end connected to the head and a second end opposing the first end. The second group of wings may be disposed axially around the center axis of the head, each of the second group of wings has a second length, and includes a first end connected to the head and a second end opposing the first end. The first length may be different from the second length.

In another aspect, a snap fit fastener of the present disclosure may include a head, a plurality of wings, a first group of protrusions, and a second group of protrusions. The plurality of wings may be disposed axially around a center axis of the head, each of the wings includes a first end connected to the head and a second end opposing the first end. The first group of protrusions may be disposed outwardly on a selected number of the wings with each of the first group of protrusions positioned at a first distance from the first end of the wings. Further, the second group of protrusions may be disposed outwardly on a selected number of the wings with each of the second group of protrusions positioned at a second distance from the first end of the wings. The first distance may be different from the second distance.

The above and other aspects of the present disclosure are described in more details in the following contexts. It is to be understood that both the foregoing summary and the following detailed description are exemplary and are intended to provide further explanation of the disclosed subject matter as claimed. Other features, objects, and advantages of the present invention will be apparent from the description, the accompanying drawings, and the appended claims.

BRIEF DESCRIPTION OF THE DRAWINGS

So that the manner in which the above described features of the present disclosure can be understood, a more specific description of the disclosure, briefly summarized above, may be had by reference to embodiments, some of which are illustrated in the appended drawings. However, the appended drawings illustrate only exemplary embodiments of this disclosure. It is to be understood that the disclosure may admit to other equally effective embodiments, and therefore the appended drawings should not be considered as limiting the scope of the present disclosure.

To facilitate understanding, identical reference numerals have been used, where possible, to designate identical elements that are common in the figures. For the sake of clarity, the various embodiments shown in the figures are not necessarily drawn to scale and are illustrative representations.

DETAILED DESCRIPTION

Now the embodiments of the present disclosure will be described in details with reference to the drawings.

Figure 1:
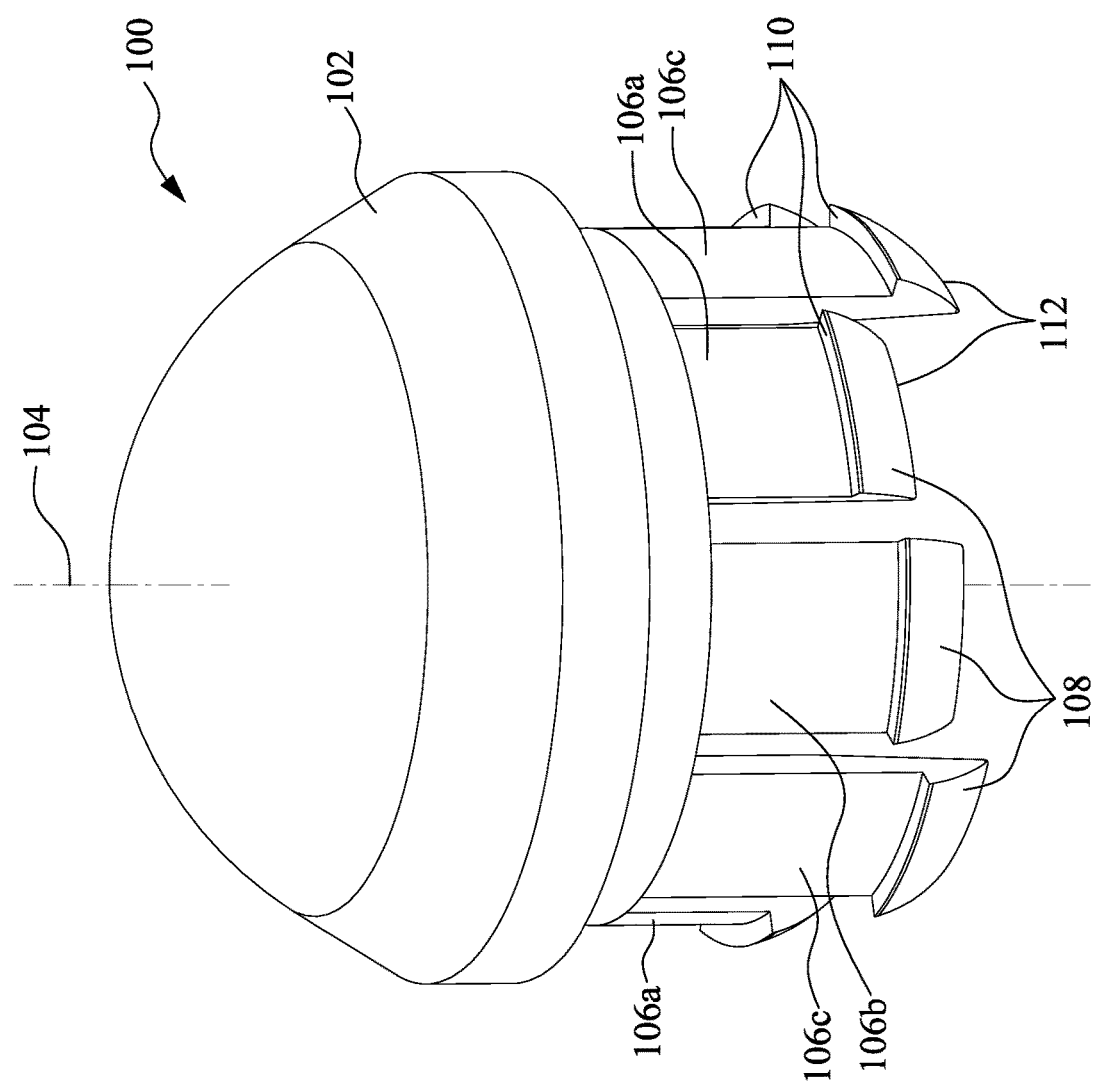
FIG. 1 is a schematic perspective view of a snap fit fastener showing three groups of wings according to an embodiment of the present disclosure.

FIG. 1 is a schematic perspective view of a snap fit fastener 100 according to an embodiment of the present disclosure. The snap fit fastener 100 may include a head 102 and a plurality of wings 106*a*, 106*b*, 106*c*, each with a first end connected to the head 102. The plurality of wings 106*a*, 106*b*, 106*c* are disposed axially around a center axis 104 of the head 102. As such, the plurality of wings 106*a*, 106*b*, 106*c* can be pressed and fit into a hole on a panel of a product (not shown) when being installed. As an example, the panel of the product can be a shield, a plate, a circuit board, or any other sheet-like structure, with at least a hole disposed thereon for receiving the snap fit fastener 100. Further, the housing may have different thickness when being replaced or exchanged from the product.

With reference to the embodiment shown in FIG. 1, there are three groups of wings 106*a*, 106*b*, 106*c* extending from the head 102, each group has different length for accommodating the different thickness of the housing. Further, at least one protrusions 108 is disposed at the second end of each of the plurality of wings 106a, 106b, 106c, and each of the protrusions 108 extends outwardly from the second end of the wings 106a, 106b, 106c. Therefore, the protrusions 108 may grab onto the inner surface of the housing securely when being installed. In the embodiment as shown, each protrusions 108 may have a flat platform 110 facing the head 102 and a tapered end 112 to facilitate penetrating into the hole of the housing. However, other configurations of the protrusions are also contemplated.

In the embodiment as shown, three groups of wings 106a, 106b, 106c with different lengths are disposed in alternatives. However, the groups of wings 106a, 106b, 106c can also be arranged in different orders. In one embodiment, the first group of wings 106a may have the length for accommodating the housing with about 3 mm thickness; the second group of wings 106b may be designed to accommodate the housing with about 5 mm thickness; and the third group of wings 106c may be designed to accommodate the housing with about 8 mm thickness. In another embodiment, the first, second, third groups of wings 106a, 106b, 106c may accommodate the housing with about 10 mm, 12 mm, 15 mm thickness, respectively. Other dimensions of the length combinations of the wings 106a, 106b, 106c for accommodating different thicknesses of the housing are also contemplated.

Although three groups of wings 106a, 106b, 106c are shown in FIG. 1, more or less groups are also contemplated. In addition, the number of wings within each group can be adjusted as needed. In a preferred embodiment, each group of the wings may have at least three individual wings disposed evenly around the head. As such, the snap fit fastener 100 can be held securely in place by at least one group of wings when being installed.

In the embodiment shown in FIG. 1, the head 102 has a rounded shape. In one embodiment, the head 102 can be made of transparent materials, and the plurality of wings 106a, 106b, 106c can be made of different materials from the head 102. In another embodiment, the head 102, the plurality of wings 106a, 106b, 106c, as well as the protrusions 108 are molded and formed in one piece. In yet another embodiment, the plurality of wings 106a, 106b, 106c are separate components from the head 102, and can be arranged and combined to the head 102 as desired.

Figure 2:
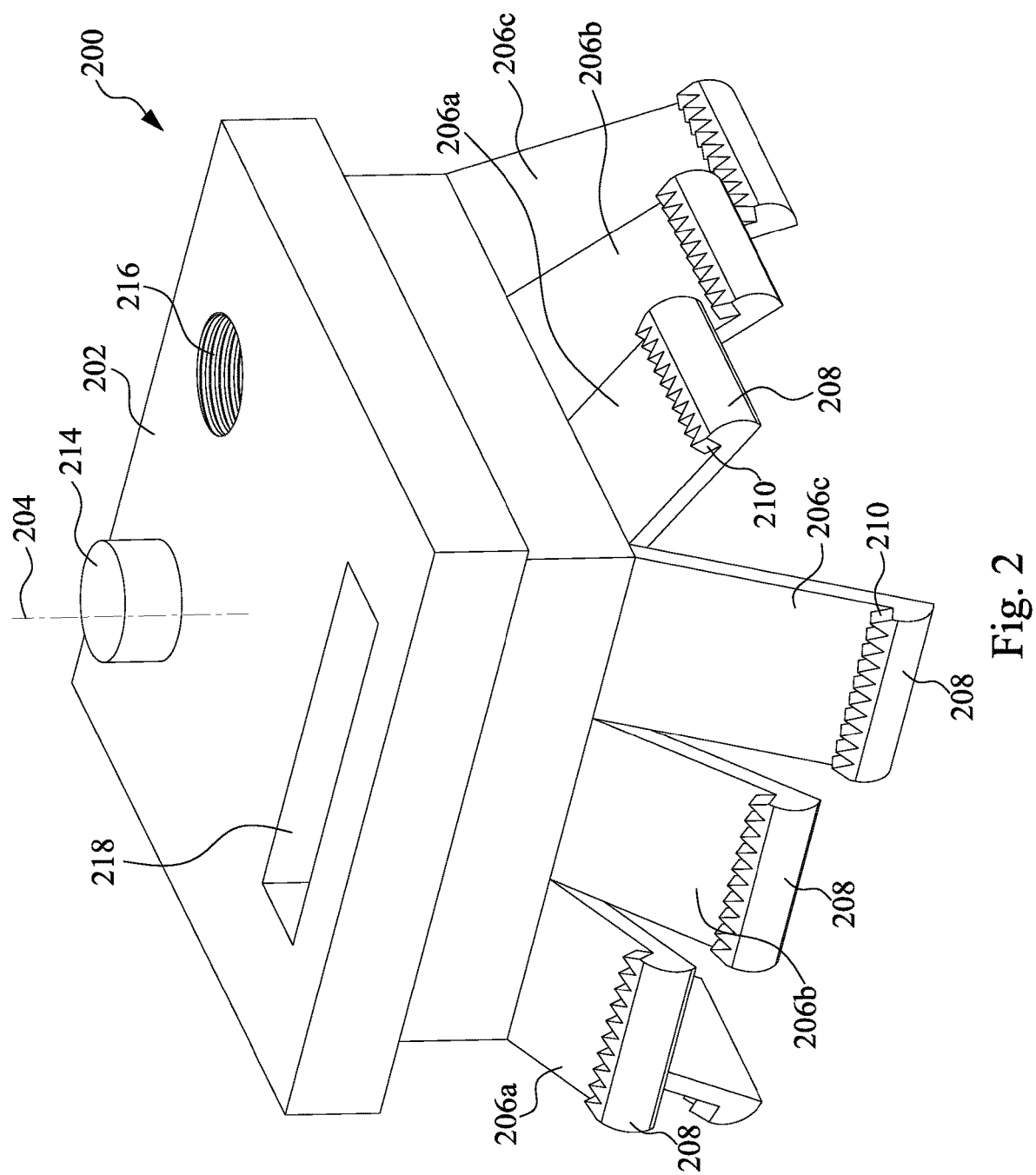
FIG. 2 is a schematic perspective view of a snap fit fastener according to another embodiment of the present disclosure.

FIG. 2 is a schematic perspective view of a snap fit fastener 200 according to another embodiment of the present disclosure. With reference to FIG. 2, the head 202 is configured to have a rectangular shape. Further, a plurality of features 214, 216, 218 can be disposed on or within the head 202. For example, a bump 214 or a groove 218 can be disposed on the head 202 of the snap fit fastener 200. Alternatively or in addition, a threaded hole 216 can be disposed on the head 202. Consequently, other components can be connected to the snap fit fastener 200 through the features 214, 216, 218 of the head 202.

In the embodiment shown in FIG. 2, there are also three groups of wings 206a, 206b, 206c disposed around the head 202. Each group has different length extending approximate the edges of the head 202. Moreover, each group of the wings 206a, 206b, 206c may be slightly biased outwardly away from the center axis 204 of the head 202. Under such arrangement, the wings without matching the thickness of the housing may facilitate securing the snap fit fastener 200 in place by abutting the sidewalls of the hole. In the embodiment as shown, each group of the wings 206a, 206b, 206c is biased outwardly from the head 202 with a different slope. However, in other embodiments, the wings can be biased with the same slope or even individual angles as desired.

As shown in FIG. 2, the protrusions 208 disposed at the second end of the wings 206a, 206b, 206c may further has serrated platforms 210 facing the head 202. These serrated platforms 210 will grab onto the inner surface of the housing when installed, and will prevent the snap fit fastener 200 from rotating.

Figure 3:
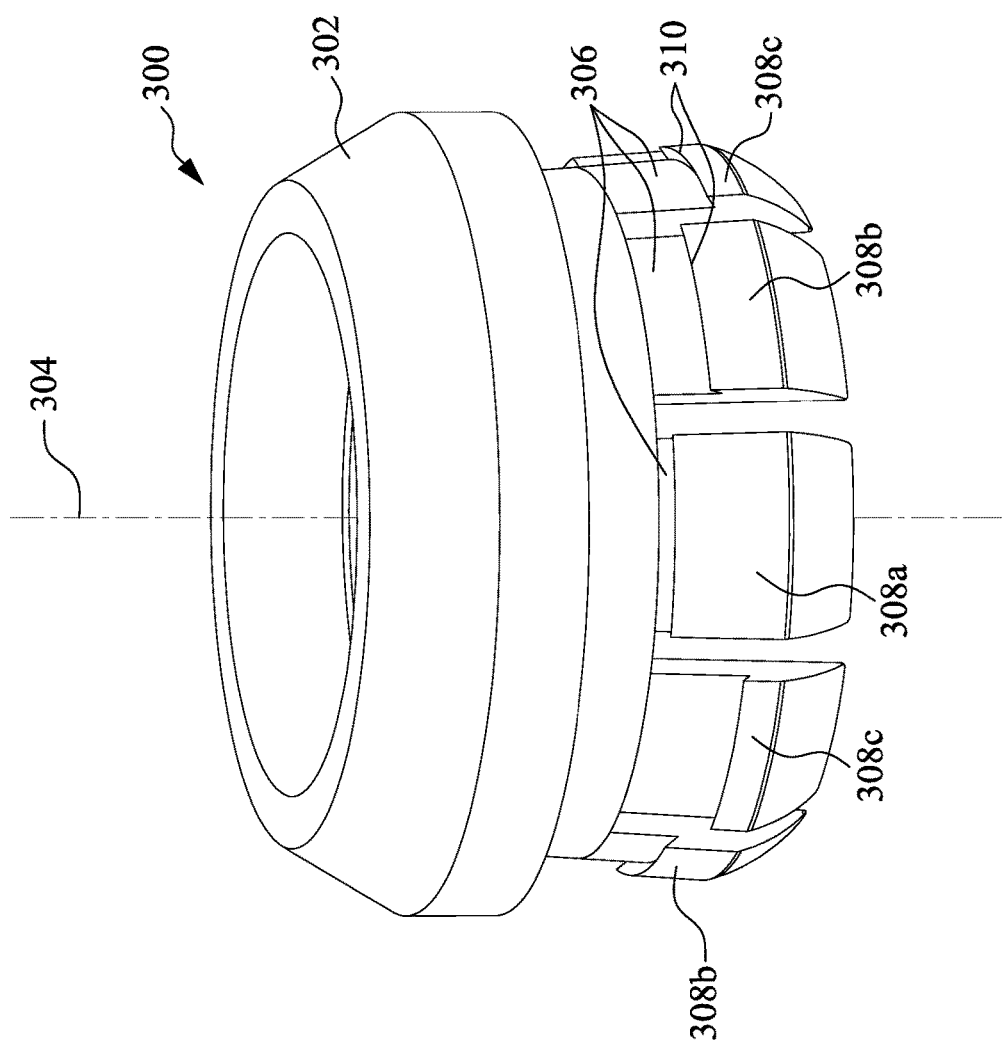
FIG. 3 is a schematic perspective view of a snap fit fastener according to another embodiment of the present disclosure.

FIG. 3 is a schematic perspective view of a snap fit fastener 300 according to another embodiment of the present disclosure. With reference to FIG. 3, the head 302 has a shape of a ring surrounding the center axis 304 and has an opening in between. The plurality of wings 306 ae disposed and extended axially around the center axis 304 of the head 302, each with the first end connected to the head 302 approximate the circumference of the ring.

In this embodiment, each of the plurality of wings 306 has the same length. Further, three groups of protrusions 308a, 308b, 308c are disposed on the wings 306 at different positions. For example, the first group of protrusions 308a can be disposed on a selected number of the wings 306, and located at a first distance most approximate to the head 302. Further, the second and third groups of protrusions 308c are disposed on the other individual wings 306, respectively, at a position different from the first group of protrusions 308a. Consequently, the snap fit fastener 300 is able to fit into different thickness of the housing.

In one embodiment, the first group of protrusions 308a is positioned to fit the housing with about 3 mm thickness; the second group of protrusions 308b is positioned to fit the housing with about 5 mm thickness; and the third group of protrusions 308c is positioned to fit the housing with about 8 mm thickness. In another embodiment, the first, second, third groups of protrusions 308a, 308b, 308c are positioned to fit the housing with about 10 mm, 12 mm, 15 mm thickness, respectively. Further, the protrusions 308a, 308b, 308c may also be disposed at other positions of the wings 306 for accommodating different thicknesses of the housing.

With reference to FIG. 3, each of the protrusions 308a, 308b, 308c may extend upwardly and outwardly from the wings 306. As such, the barb shape of the protrusions 308a, 308b, 308c can secure the snap fit fastener 300 in place when being installed, and will prevent the snap fit fastener 300 from falling out.

Figure 4:
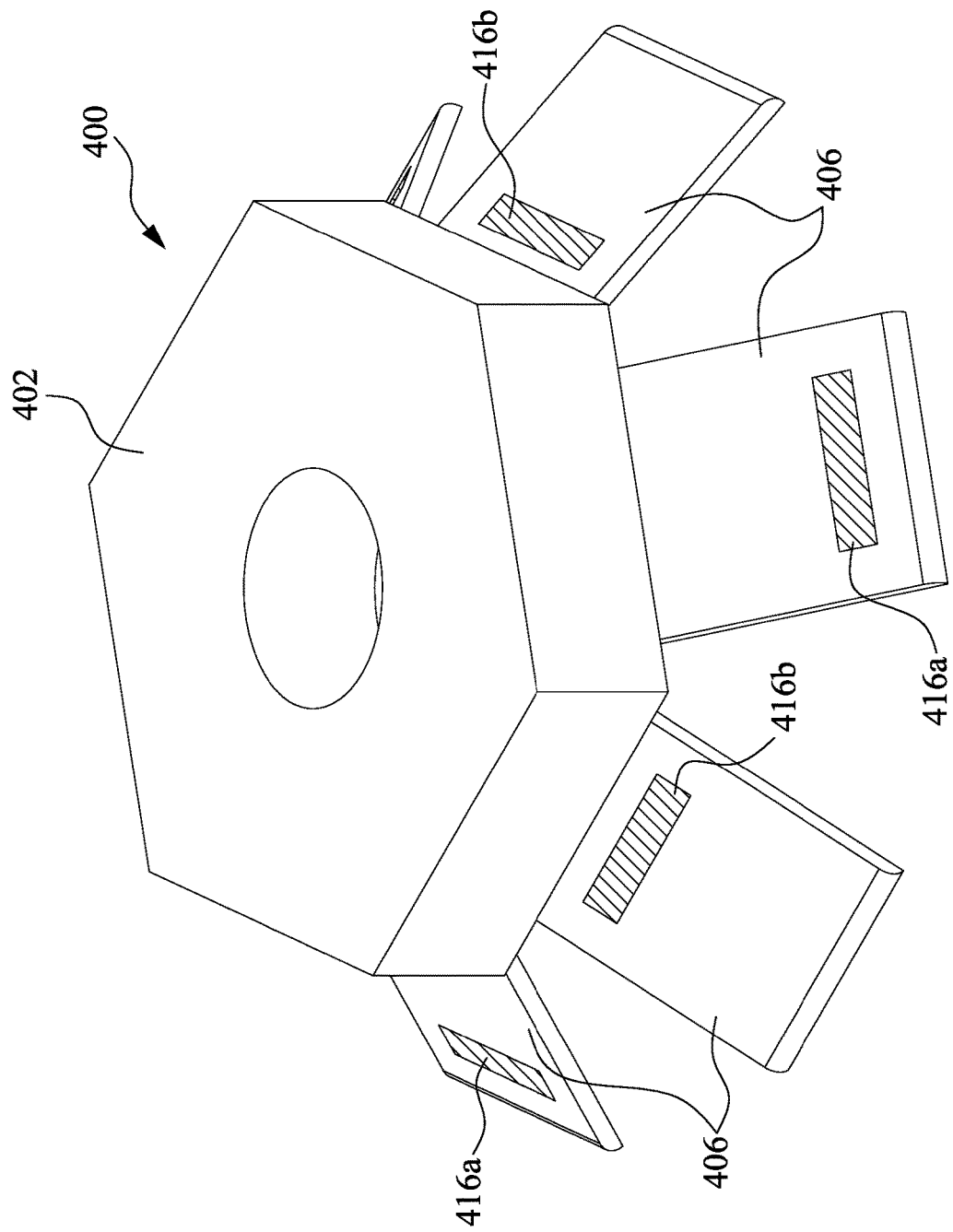
FIG. 4 is a schematic perspective view of a snap fit fastener according to yet another embodiment of the present disclosure.

FIG. 4 is a schematic perspective view of a snap fit fastener 400 according to yet another embodiment of the present disclosure. With reference to FIG. 4, the head 402 may have the shape of a hexagon with a hole disposed in between for further connection with other components. Under such arrangement, the plurality of wings 406 can be disposed at each side of the head 402. Alternatively, the shapes of polygon with multiple sides are also contemplated for forming the head 402 of the snap fit fastener 400. As described above, each of the wings 406 can be slightly biased outwardly from the head, so has to provide extra force abutting the side walls of the hole when being installed.

In this embodiment, two groups of attachments 416a, 416b are disposed at different positions on the wings 406, respectively. Further, corresponding attachments (not shown) can be disposed within the housing to which the snap fit fastener 400 is installed. As such, the snap fit fastener 400 can be applicable on different housings of the product by matching the different groups of attachments 416a, 416b. In one embodiment, the attachments 416a, 416b can be magnets. In another embodiment, the attachments 416a, 416b may be adhesives. Other attaching means for enhancing the connections of the snap fit fastener 400 are also contemplated.

Exemplary embodiments of the present disclosure have been described with reference to the drawings. It should be noted that the features described with respect to one embodiment can be advantageously applied to other embodiments unless being expressively limited. Further, the shapes, dimensions, numbers described above should be considered as examples only. It will be apparent to those skilled in the art that various modifications and alterations can be made to the present disclosure without departing from the scope and spirit as defined by the appended claims.

What is claimed is:

1. A snap fit fastener, comprising:
a head;
a first group of at least three wings disposed axially around a center axis of the head, each of the first group of wings has a first length, and includes a first end connected to the head and a second end opposing the first end;
a second group of at least three wings disposed axially around the center axis of the head, each of the second group of wings has a second length, and includes a first end connected to the head and a second end opposing the first end; and
a third group of wings disposed axially around the center axis of the head, each of the third group of wings has a third length, and includes a first end connected to the head and a second end opposing the first end;
wherein the first length is different from the second length, the third length is different from the first and second lengths, the first, second and third groups of wings surrounds the center axis of the head in alternatives, and the head and at least one of the first group of wings and the second group of wings cooperate to fasten two or more objects together.

2. The snap fit fastener according to claim 1, further comprising a plurality of protrusions disposed outwardly at the second ends of each of the first group and second group of wings.

3. The snap fit fastener according to claim 2, wherein each of the plurality of protrusions forms a flat platform facing the head adjacent to the second ends of each of the first group and second group of wings.

4. The snap fit fastener according to claim 1, wherein each of the first group of wings extends outwardly with respect to the center axis of the head from the first end to the second end by a first slope.

5. The snap fit fastener according to claim 1, wherein the head is rounded and the first ends of the first group of wings are connected to the head along a circumference of the head.

6. A snap fit fastener, comprising:
a head;
a plurality of wings disposed axially around a center axis of the head, each of the wings includes a first end connected to the head and a second end opposing the first end;
a first group of protrusions disposed outwardly on a selected number of the wings with each of the first group of protrusions positioned at a first distance from the first end of the wings;
a second group of protrusions disposed outwardly on a selected number of the wings with each of the second group of protrusions positioned at a second distance from the first end of the wings; and
a third group of protrusions disposed outwardly on a selected number of the wings with each of the third group of protrusions positioned at a third distance from the first end of the wings;
wherein the first distance is different from the second distance, the third distance is different from the first and second distances, the first, second, and third groups of protrusions are respectively disposed on corresponding one of the plurality of wings in alternatives, and each of the first group of protrusions extends upwardly and outwardly from the wings to form a barb on the wings.

7. The snap fit fastener according to claim 6, wherein each of the first group of protrusions forms a first flat platform facing the head on the wings at the first distance; each of the second group of protrusions forms a second flat platform facing the head on the wings at the second distance; and each of the third group of protrusions forms a third flat platform facing the head on the wings at the third distance.

8. The snap fit fastener according to claim 6, wherein each of the first group of protrusions extends upwardly and outwardly from the wings to form a barb on the wings.

9. The snap fit fastener according to claim 6, wherein each of the plurality of wings extends outwardly with respect to the center axis of the head from the first end to the second end by a slope.

10. The snap fit fastener according to claim 6, wherein the head is rounded and the first ends of the plurality of wings are connected to the head along a circumference of the head.

* * * * *